US010404732B2

(12) United States Patent
Munro et al.

(10) Patent No.: US 10,404,732 B2
(45) Date of Patent: Sep. 3, 2019

(54) SYSTEM AND METHOD FOR AUTOMATED NETWORK MONITORING AND DETECTION OF NETWORK ANOMALIES

(71) Applicant: SDN Systems, LLC, Shrewsbury, NJ (US)

(72) Inventors: Mark Munro, Spring Lake, NJ (US); Konstantin Babenko, Palisades Park, NJ (US); Taras Yatskiv, Kyiv (UA); Alexander Makeev, Mariupol (UA)

(73) Assignee: SDN Systems, LLC, Shrewsbury, NJ (US)

( * ) Notice: Subject to any disclaimer, the term of this patent is extended or adjusted under 35 U.S.C. 154(b) by 253 days.

(21) Appl. No.: 15/622,400

(22) Filed: Jun. 14, 2017

(65) Prior Publication Data

US 2018/0020015 A1    Jan. 18, 2018

Related U.S. Application Data

(60) Provisional application No. 62/349,988, filed on Jun. 14, 2016.

(51) Int. Cl.
*H04L 29/06* (2006.01)
*G06N 20/00* (2019.01)
(Continued)

(52) U.S. Cl.
CPC .......... *H04L 63/1425* (2013.01); *G06F 17/16* (2013.01); *G06F 21/552* (2013.01);
(Continued)

(58) Field of Classification Search
CPC ............. H04L 63/1416; H04L 63/1408; H04L 63/1441; H04L 63/1458; G06F 21/552
(Continued)

(56) References Cited

U.S. PATENT DOCUMENTS

| 7,631,355 B2* | 12/2009 | Bolt ................... H04L 41/0631 709/223 |
| 2002/0082886 A1* | 6/2002 | Manganaris .......... G06F 21/552 719/318 |

(Continued)

OTHER PUBLICATIONS

International Search Report in PCT/US2017/037418 (dated Aug. 31, 2017).
(Continued)

*Primary Examiner* — Evans Desrosiers
(74) *Attorney, Agent, or Firm* — Pryor Cashman LLP

(57) ABSTRACT

A system and method for unsupervised detection of system anomalies in a network, including one or more network elements, a flow collector configured to collect instances of network data from the one or more network elements, a historical dataset database configured to store the instances of network data, a historical dataset pattern extractor configured to analyze the instances of network data and produce a historical behavioral pattern for each of the instances of network data, and a flow stream processor configured to analyze instances of network data in real time, produce a current behavioral pattern for each of the instances of network data, compare the current behavioral pattern to a corresponding historical behavioral pattern, and detect an anomaly based on the comparison between the current behavioral pattern and the corresponding historical behavioral pattern.

18 Claims, 6 Drawing Sheets

(51) Int. Cl.
    *G06F 17/16*    (2006.01)
    *G06F 21/55*    (2013.01)
(52) U.S. Cl.
    CPC .......... *G06F 21/554* (2013.01); *G06N 20/00* (2019.01); *H04L 63/1441* (2013.01); *G06F 2221/2101* (2013.01)
(58) Field of Classification Search
    USPC .......................................................... 726/23
    See application file for complete search history.

(56) References Cited

U.S. PATENT DOCUMENTS

| | | | |
|---|---|---|---|
| 2004/0006398 A1* | 1/2004 | Bickford | G05B 23/0254 700/30 |
| 2004/0114519 A1 | 6/2004 | MacIsaac | |
| 2005/0157662 A1 | 7/2005 | Bingham et al. | |
| 2007/0169196 A1 | 7/2007 | Dapp | |
| 2008/0002595 A1 | 1/2008 | Rao | |
| 2010/0257580 A1* | 10/2010 | Zhao | H04L 43/00 726/1 |
| 2015/0128274 A1* | 5/2015 | Giokas | H04L 63/1416 726/23 |

OTHER PUBLICATIONS

Written Opinion of the International Searching Authority in PCT/US2017/037418 (dated Aug. 31, 2017).

\* cited by examiner

SYSTEM AND METHOD FOR AUTOMATED NETWORK MONITORING AND DETECTION OF NETWORK ANOMALIES

CROSS-REFERENCE TO RELATED APPLICATIONS

The present application claims priority to U.S. provisional application Ser. No. 62/349,988, filed Jun. 14, 2016, the disclosure of which is incorporated herein by reference in its entirety.

TECHNICAL FIELD

The present invention generally relates to systems and methods for monitoring the performance of Virtual Network Function (VNF) elements managed through a single system. Specifically, the present invention relates to automated provisioning, analytics, monitoring, and life-cycle management of such elements, in addition to providing meaningful representations of analytical data and detecting system anomalies.

BACKGROUND OF THE INVENTION

In a Network Function Virtualization (NFV) architecture, a VNF is responsible for handling specific network functions that run on one or more virtual machines on top of the hardware networking infrastructure. The infrastructure may include routers, switches, servers, cloud computing systems, and the like. Individual VNFs may be chained or combined together in a building block-style fashion to deliver full-scale networking communication services.

In presently known VNF systems, monitoring and detecting anomalies in an effective manner is difficult in light of problems relating to heterogeneous environment, traffic variability, number of services on each network instance, seasonality, and anomaly characterization. Often, these presently known VNF systems rely on static thresholds for anomaly detection, such as signature-based approaches, which are not effective due to an inability to adapt to network topology and a volatile heterogeneous environment. Moreover, in presently known dynamic VNF systems, such systems rely on volume-based approaches with dynamic thresholds, which are not effective since small volumes of traffic can contain markers of network intrusion.

There is a need for an effective VNF monitoring and detection system that is able to operate in an unsupervised manner, incorporate feedback from a system administrator, and adapt to fluctuating traffic independently. Additionally, such a system should be able to operate and react in real time due to the characteristically brief duration of network intrusions. Finally, such a system should be able to extract sufficient information regarding anomaly activity.

SUMMARY OF THE INVENTION

In general, in one aspect, the invention features a system for unsupervised detection of system anomalies in a network, including one or more network elements, a flow collector configured to collect instances of network data from the one or more network elements, a historical dataset database configured to store the instances of network data, a historical dataset pattern extractor configured to analyze the instances of network data and produce a historical behavioral pattern for each of the instances of network data, and a flow stream processor configured to analyze instances of network data in real time, produce a current behavioral pattern for each of the instances of network data, compare the current behavioral pattern to a corresponding historical behavioral pattern, and detect an anomaly based on the comparison between the current behavioral pattern and the corresponding historical behavioral pattern.

Implementations of the invention may include one or more of the following features. The network data may include a timestamp, a session duration, a protocol, a source IP address, a source port, a destination IP address, a destination port, a number of bytes, a number of packets, and a number of transmission control protocol (TCP) flags. The historical dataset pattern extractor may be configured to process the instances of network data by an unsupervised clustering algorithm. The historical dataset pattern extractor may be configured to produce a metric threshold value for each of the instances of network data, where a value based on the current behavioral pattern in excess of the metric threshold value is indicative of a potential system anomaly. The invention may further include a historical model storage database for storing historical models based on the historical behavioral pattern and the metric threshold value. The historical behavioral pattern and the current behavioral pattern may be represented as respective vectors, where the comparison between the current behavioral pattern and the corresponding historical behavioral pattern is a calculation of standardized Euclidean distance between the respective vectors. The flow stream processor may be configured to produce a notification upon detection of an anomaly. The notification may be stored in an anomalies storage database and sent to a system administrator. The notification may be sent to a rules engine, where the rules engine may be configured to select a response to the notification. The rules engine may be configured to convert the notification into a custom behavioral pattern and store the custom behavioral pattern in a historical dataset pattern storage database.

In general, in another aspect, the invention features a method for unsupervised detection of system anomalies in a network, including collecting instances of network data from one or more network elements in the network in a flow collector, storing the instances of network data in a historical dataset database, analyzing the instances of network data and producing a historical behavioral pattern for each of the instances of network data by a historical dataset pattern extractor, analyzing the instances of network data in real time and producing a current behavioral pattern for each of the instances of the network data by a flow stream processor, comparing the current behavioral pattern to a corresponding historical behavioral pattern, and detecting an anomaly based on the comparison between the current behavioral pattern and the corresponding historical behavioral pattern.

Implementations of the invention may include one or more of the following features. The network data may include a timestamp, a session duration, a protocol, a source IP address, a source port, a destination IP address, a destination port, a number of bytes, a number of packets, and a number of transmission control protocol (TCP) flags. The historical dataset pattern extractor may be configured to process the instances of network data by an unsupervised clustering algorithm. The historical dataset pattern extractor may be configured to produce a metric threshold value for each of the instances of network data, where a value based on the current behavioral pattern in excess of the metric threshold value is indicative of a potential system anomaly. The invention may further include storing historical models based on the historical behavioral pattern and the metric threshold values by a historical model storage database. The historical behavioral pattern and the current behavioral pattern may be represented as respective vectors, where the comparison between the current behavioral pattern and the corresponding historical behavioral pattern is a calculation of standardized Euclidean distance between the respective vectors. The flow stream processor may be configured to produce a notification upon detection of an anomaly. The notification may be stored in an anomalies storage database and sent to a system administrator. The notification may be sent to a rules engine, where the rules engine may be configured to select a response to the notification. The rules engine may be configured to convert the notification into a custom behavioral pattern and store the custom behavioral pattern in a historical dataset pattern storage database.

DETAILED DESCRIPTION OF THE INVENTION

The present invention involves the construction of behavioral patterns for each network instance and real time comparison between these patterns and patterns for each network instance based on sequentially-collected data. In light of fluctuating network traffic and the associated inability to produce perfect patterning, the present invention provides for each pattern to include a threshold to distinguish normal and abnormal traffic. Incoming traffic of each network instance must fluctuate within the pattern plus the threshold in order to be characterized as normal traffic.

System

The present invention is employed in a system such as a cloud-native software-only NFV manager and orchestrator. This system may include Big Data analytics as well as user-defined criteria to utilize both virtual and physical network devices over the whole life cycle of the network instances required. This system may also be managed predictively in order to best assure optimum network operation. This system may also provide a visual representation of network topology, simplified visual management of network product catalog, and service chaining for ease of handling complicated network configurations. Finally, this system may exceed European Telecommunications Standards Institute Industry Specification Group (ETSI ISG) NFV Management and Orchestration (MANO) standards to incorporate auto-discovery, troubleshooting, and network surveillance capacities informed and modified by an analytics package utilizing both deterministic and predictive analytics as well as machine learning.

Figure 1:
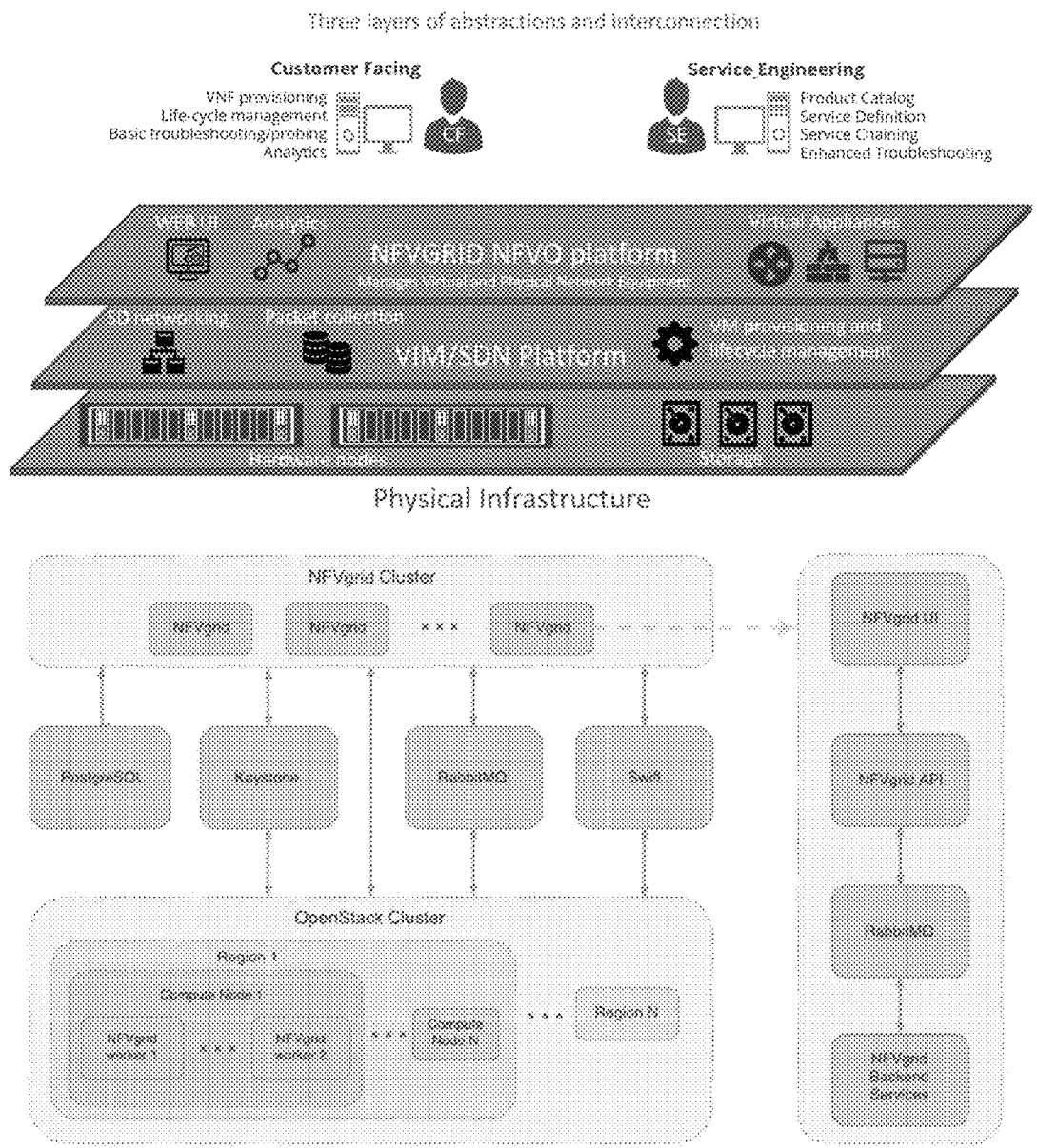
FIG. 1 shows an overview of a system capable of employing the present invention.

In terms of system architecture, the system may be built on ETSI ISG NFV MANO for its core MANO architecture. As such, the system platform layer may sit between the Customer and Service Engineering faces on one side and the Virtualized Infrastructure Manager (VIM)/Software-Defined Networking (SDN) layer with physical infrastructure layers on the other, as illustrated in FIG. 1. As further illustrated by FIG. 1, the system may spin, maintain, and end services to control the virtual and physical layers of the network, such as through the use of OpenStack and Contrail. Any VNF or operations support system (OSS) using open application programming interfaces (APIs) may be controlled on an as-needed basis. OSS/business support system (BSS) integration may be performed through the use of representational state transfer (RESTful) APIs.

Additionally, network and cloud security analytics may incorporate all Layer 2 (L2), Layer 3 (L3), virtual private network (VPN), and dedicated internet access (DIA) traffic as well as all application and system logs under a single platform to provide persistent identifier (PID)-level granularity where necessary without compromising network speed. Analyzed data may then be further processed under a graph-based data aggregation and correlation which, when taken together, drives machine learning to hone further analysis and decision making.

Packet/log processing may be handled in an analytical engine utilizing Logstash for logs, Cassandra for Big Data database processing of network- and platform-derived data, and Apache Spark or Hadoop for batch processing. The processing output may be sent to a user interface (UI) or customer application.

Upon installation and configuration of master and worker nodes, new nodes may be onboarded through a no-touch autodiscovery and configuration process in which the only required manual interactions involve the physical connections of the network. On-demand automated provisioning and orchestration as well as VNF management coupled with dynamic service chaining may be informed by an analytics engine as well as user input, which results in improved management at business, service, and component capacity levels.

The system may feature a full network topology view and a full connection network representation that enables improved security as a result of the data engine's ability to detect unusual behavior at fine-grained levels. Packets and systems logs may be brought together for further relational insights and threat detection.

Subsystem

The present invention may take the form of an independently operating and independently deployable subsystem within a system, such as the system described herein. The present invention may drive any NFV MANO solution, and can benefit data centers that need to control legacy equipment, independent systems, and multiple SDNs.

The present invention involves a single platform, which streamlines the packet/log analysis process, minimizes the period of time required to auto-detect and counter anomalies, and speeds up graph-based data aggregation and correlation. This correlation also extends to analysis of the network and application aspects, which permits the present invention to provide a more complete environmental analysis.

Figure 2:
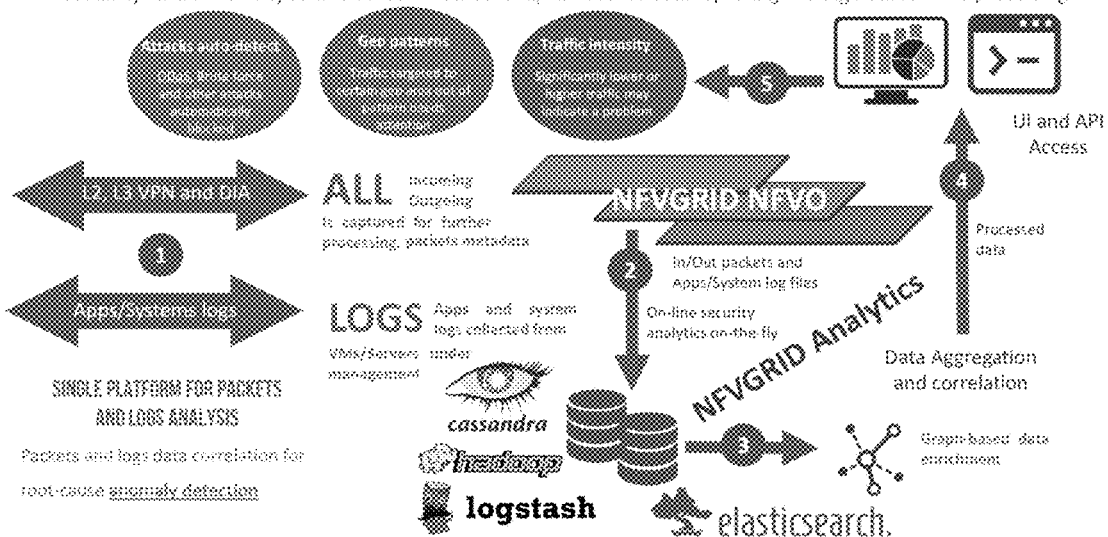
FIG. 2 shows an overview of one embodiment of the process of the present invention.

FIG. 2 illustrates a basic overview of one embodiment of the process of the present invention. In this embodiment, the following process is implemented:

1. All inbound/outbound packets and log entries are collected into a single platform;
2. Packets and logs are pre-processed and filtered;
3. Data is aggregated, correlated, and enriched;
4. UI and APIs receive the results; and 5. Further decision-making occurs and data feedback for machine learning is performed.

A packet/log analysis constitutes an important function of the present invention, with such analysis grounded in an overall cloud-native emphasis and SDN-focused Big Data analytics roots. The use of tools and processes found in SDN informs the type of data used, including:
- User-provided data, such as gateway, firewall, and network element configuration files, IP addresses, port assignments, and the like;
- System-generated data, such as alarms, event logs, statistics, crush files, and the like; and
- Service data, such as signaling traffic, user plane traffic, and the like.

Figure 3:
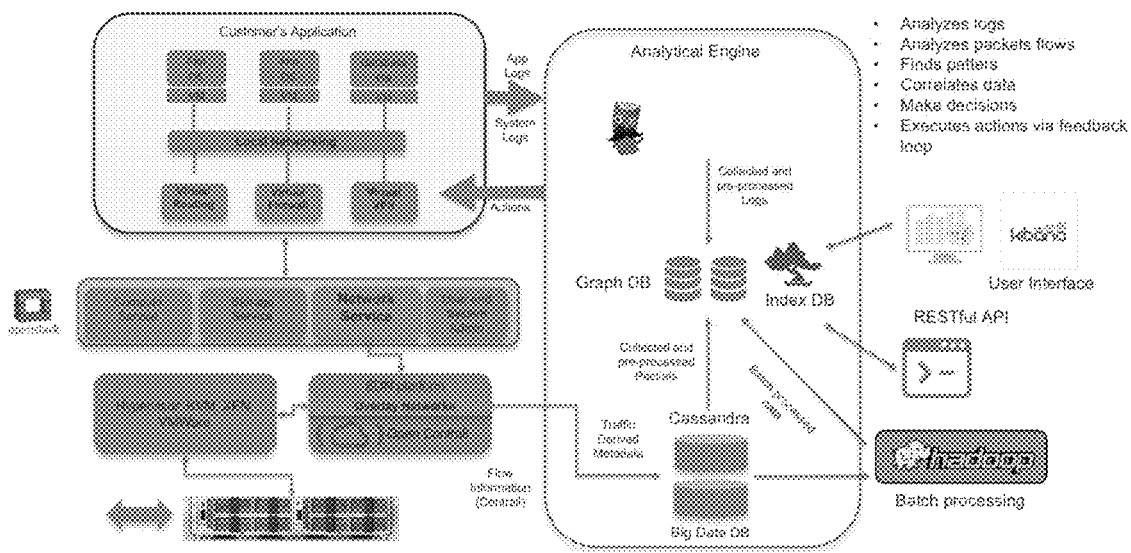
FIG. 3 shows an overview of a pathway for packet/log processing according to one embodiment of the present invention.

FIG. 3 illustrates a basic overview of a pathway for packet/log processing according to one embodiment of the present invention.

One approach of the present invention is the following problem solving-based approach.

First, data about network activity is collected in a database as a sequence of network flows using, for example, a flow collector, such as a NetFlow collector. For each network instance, incoming and outgoing traffic is collected with reference to time. Additionally, the network flows contain the following data: timestamp, session duration, protocol, source IP address, source port, destination IP address, destination port, number of bytes, number of packets, and transmission control protocol (TCP) flags.

Second, behavioral patterns are constructed for each network instance individually. Use of a network flow algorithm aggregates data regarding interactions of each network instance. Each network interaction record consists of: (1) for incoming traffic, source IP address, destination port, and TCP flags; (2) for outgoing traffic, target IP address, destination port, and TCP flags; (3) duration; and (4) number of bytes and packets.

Third, a sufficient and representative volume of historical data is analyzed via the following steps: (1) calculation of a distribution matrix by each port for each utilized protocol; (2) calculation of clustered patterns; and (3) production of a final structure of each pattern for each IP address.

In the first step of calculating a distribution matrix for each port by each utilized protocol, all traffic should be divided into equal time periods, with the length of each period depending on volume and quality of the incoming data. Moreover, each period should contain a representative chunk of total data. For each period, a distribution density should be calculated for each port by each utilized protocol. A distribution matrix is created whereby the rows represent time periods and the columns represent protocols/ports. The means of the distribution matrix columns are calculated, with the long tail being subsequently cut, resulting in a clean distribution matrix that includes only ports receiving a stable quantity of traffic during most measured time intervals.

In the second step of calculating clustered patterns, the clean distribution matrices for each network instance are subjected to an unsupervised clustering algorithm, such as K-means, density-based spatial clustering of applications with noise (DBSCAN), or other unsupervised clustering algorithm, so as to find clusters of similar activity. Column means, standard deviation, and entropy for all time periods per each calculated pattern are calculated. The results are frequency patterns by port, deviations around the means, and entropy values.

In the third step of producing a final structure of each pattern for each IP address, this final structure includes array centroids of each cluster, an array of common ports which contribute to clusters, an array of distribution matrices, an array of lists of standard deviations, and an array of entropies.

Fourth, threshold values for metrics are calculated. This may be accomplished by applying calculated patterns to the total volume of cleaned historical data, finding the values of each metric for each IP address per each time period, and calculating the means and standard deviations. The means plus standard deviation multiplied by a configured coefficient is the threshold value for the particular metric. These threshold values represent the maximum "normal" values of each metric.

Fifth, final model data comprising the patterns and thresholds for each IP address is created, and the model is stored in a persistent storage capacity. This storage includes storing the meta information, such as ID, creation time, and model parameters. This storage should also include the pointer to the active model. When storing a new model, said model should be compared with the active model. If significant changes exist between the new model and the active model, the new model should be sent to the system administrator for approval.

Sixth, a flow stream processing mechanism, such as a NetFlow stream processor, is employed, whereby active model data is loaded and a stream of NetFlows with mini-batches of set duration, such as 1-5 minutes depending on traffic volume, is read. The pattern comparison algorithm is then applied, in which packet distribution and entropy are calculated per each port for each IP address from a NetFlow stream, patterns and thresholds for particular IP addresses are identified, and a standardized Euclidean distance, accounting for variance, is calculated between distribution vectors from the pattern and from the stream. If the calculated metric exceeds the associated threshold, a notification, e.g., an alarm, is created. The severity of the alarm may vary depending on the extent that the calculated metric exceeds the pattern value. The notification should include all necessary information regarding the anomaly, and be stored in a database as well as sent to the system administrator for further review.

Seventh, upon creation of the notification, the notification is sent to the rules engine, which decides how to handle the particular notification. All notifications should be visible in the UI for the system administrator, who should have the ability to resolve the notification. Finally, information regarding decisions of the system administrator should be stored in a database and considered in subsequent pattern construction.

Through this problem solving-based approach, several benefits are realized: unsupervised traffic cleaning, unsupervised traffic clusterization, unsupervised behavioral pattern creation, unsupervised dynamic threshold creation, feedback consideration or recurrent supervised learning, and real time stream processing. The present invention is capable of distinguishing between normal and abnormal traffic as well as handling a network instance having multiple applications of varied behavior. As indicated in the described approach for distinguishing types of traffic, the historical data regarding network activity may be sliced into a number of parts, leaving only network sessions among IP addresses that are active during most measured time intervals. While it is possible that some "normal" traffic is removed, it is also possible to add custom patterns accounting for this potential removal. As indicated in the described approach for clustering similar activity, distributions per IP address may be separated into clusters of similar activity using an unsupervised clustering algorithm, and patterns are created for the clusters individually. Through this approach, scatter within the pattern is significantly reduced and the algorithm becomes more precise and sensitive.

Figure 4:
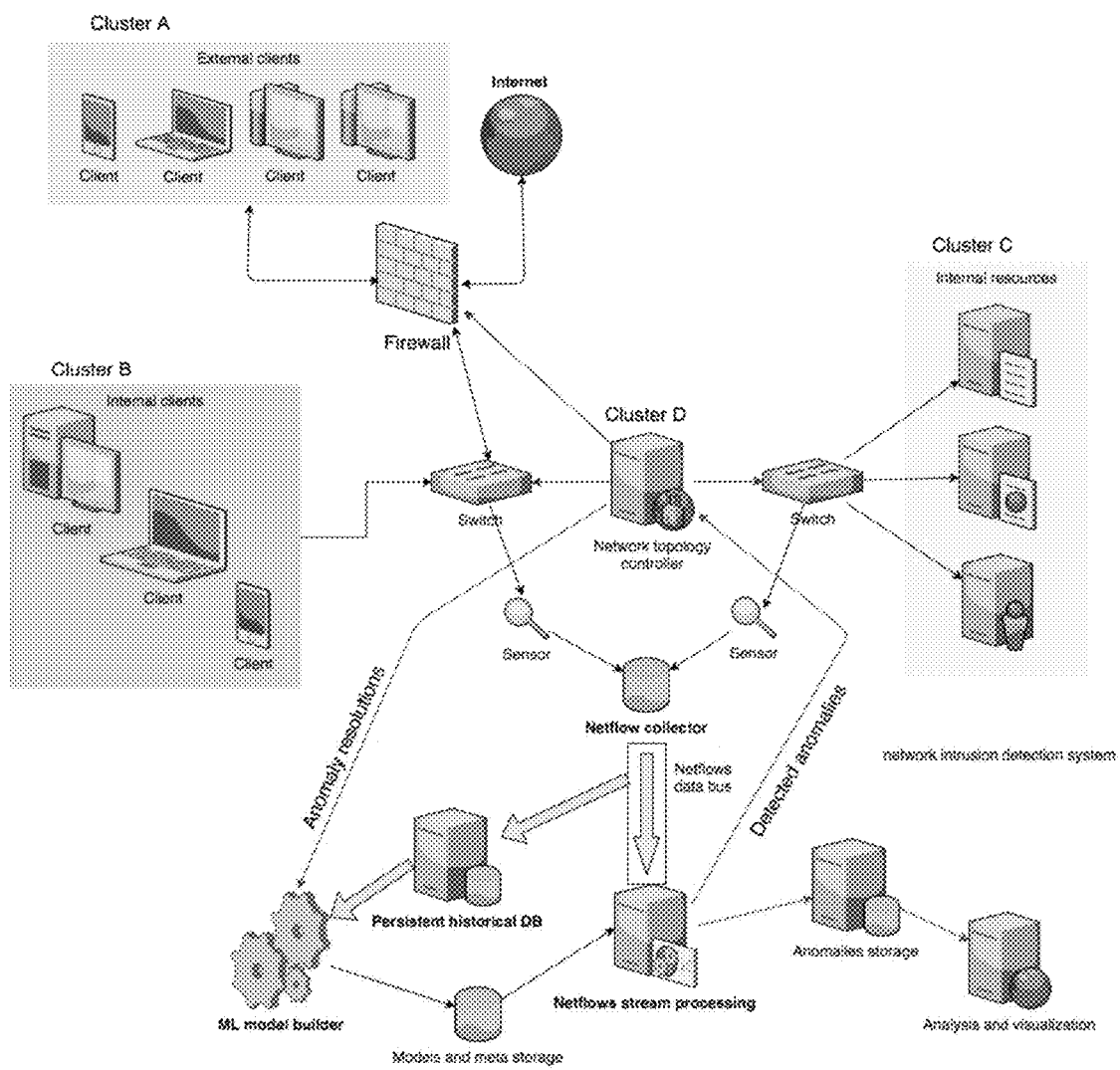
FIG. 4 shows a common architecture according to one embodiment of the present invention.

FIG. 4 illustrates a common architecture according to one embodiment of the present invention. Cluster A comprises external clients, or those network instances that are connected to a protected network via a firewall. Cluster B comprises internal clients, or those network instances that are part of a protected network and connected directly to internal switches. Cluster C comprises internal resources, or servers with sensitive data. Cluster D comprises a network topology controller, i.e., software that receives alerts and performs actions based on internal rules. This common architecture also includes the following: switches, i.e., network devices that connect all network instances into a single network; sensors, i.e., software that captures network traffic at a collection point, performs a data format conversion, and communicates with a NetFlow collector; a NetFlow collector, i.e., software that collects data from sensors and communicates with a data bus; and a data bus, which manages flow of written and read data. A network intrusion detection system is also illustrated in this common architecture as having the following components: a persistent historical database, i.e., a scaled database that stores the total volume of network data as a time series for further processing; a machine learning model builder, i.e., an algorithm set that analyzes historical data and creates a behavioral pattern, such as a clusterized historical behavioral pattern, for each network instance; models storage, i.e., a database that is able to store large binary blobs and meta information; NetFlow stream processing, i.e., an algorithm that analyzes streaming data, provides a pattern comparison between the historical behavioral pattern and a current behavioral pattern, i.e., a behavioral portrait of activity for a current period, and identifies abnormal activity; anomalies storage, i.e., a database of information about created notifications of abnormal activity; and an analysis and visualization element, i.e., software that aggregates and visualizes the entire volume of notifications.

An anomaly detection algorithm of the present invention operates only with aggregated data about interaction sessions among IP addresses. This aggregated data is captured by sensors from the collection points, collected, and sent to the common system data bus. From this data bus, information may then be stored in the persistent historical database. An algorithm may ingest the entire historical dataset, omit secondary traffic, and create individual behavioral patterns for each network instance. Another algorithm may ingest short batches of traffic, calculate necessary statistical indicators for each network instance, and perform a comparison to the associated pattern. The final metric is a measure of this comparison difference. If the difference exceeds the dynamic threshold value, the system will send a notification, such as an alarm, to the topology controller, which in turn performs one or more actions based on its internal rules.

Figure 5:
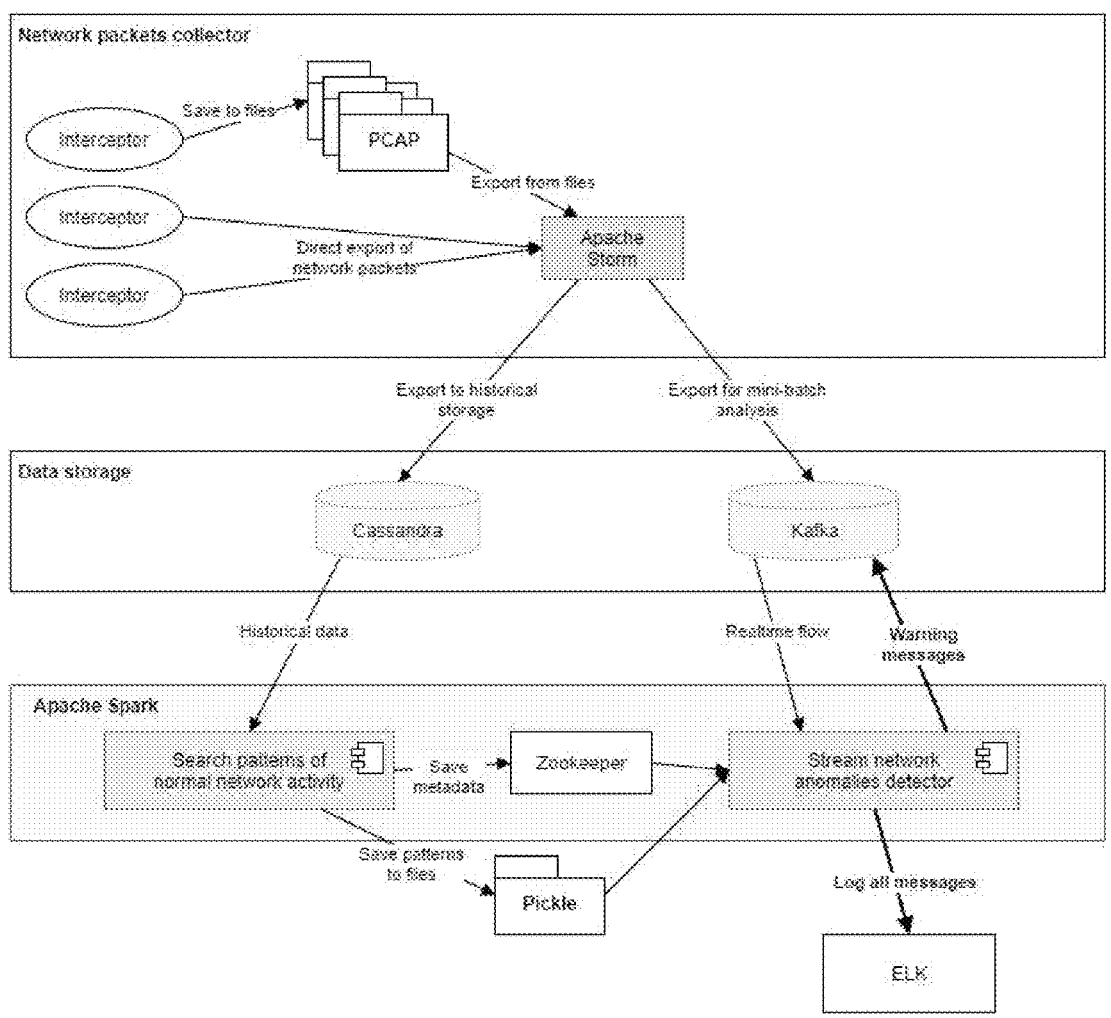
FIG. 5 shows a common architecture according to one embodiment of the present invention.

FIG. 5 illustrates a common architecture according to one embodiment of the present invention. There are three segments to the illustrated data flow: a network packets collector segment, a data storage segment, and a cluster-computing segment, e.g., a segment utilizing Apache Spark. From the network packets collector segment, data may be sent according to one of two pathways: a historical data storage pathway or a mini-batch analysis pathway. The historical data storage pathway provides the pattern creation aspect of the present invention, while the mini-batch analysis pathway provides the real time data flow aspect of the present invention. Ultimately, these two pathways converge at the anomaly detection aspect ("Stream network anomalies detector") of the present invention, where anomaly detection notifications are stored ("Warning messages") as well as logged ("Log all messages").

Figure 6:
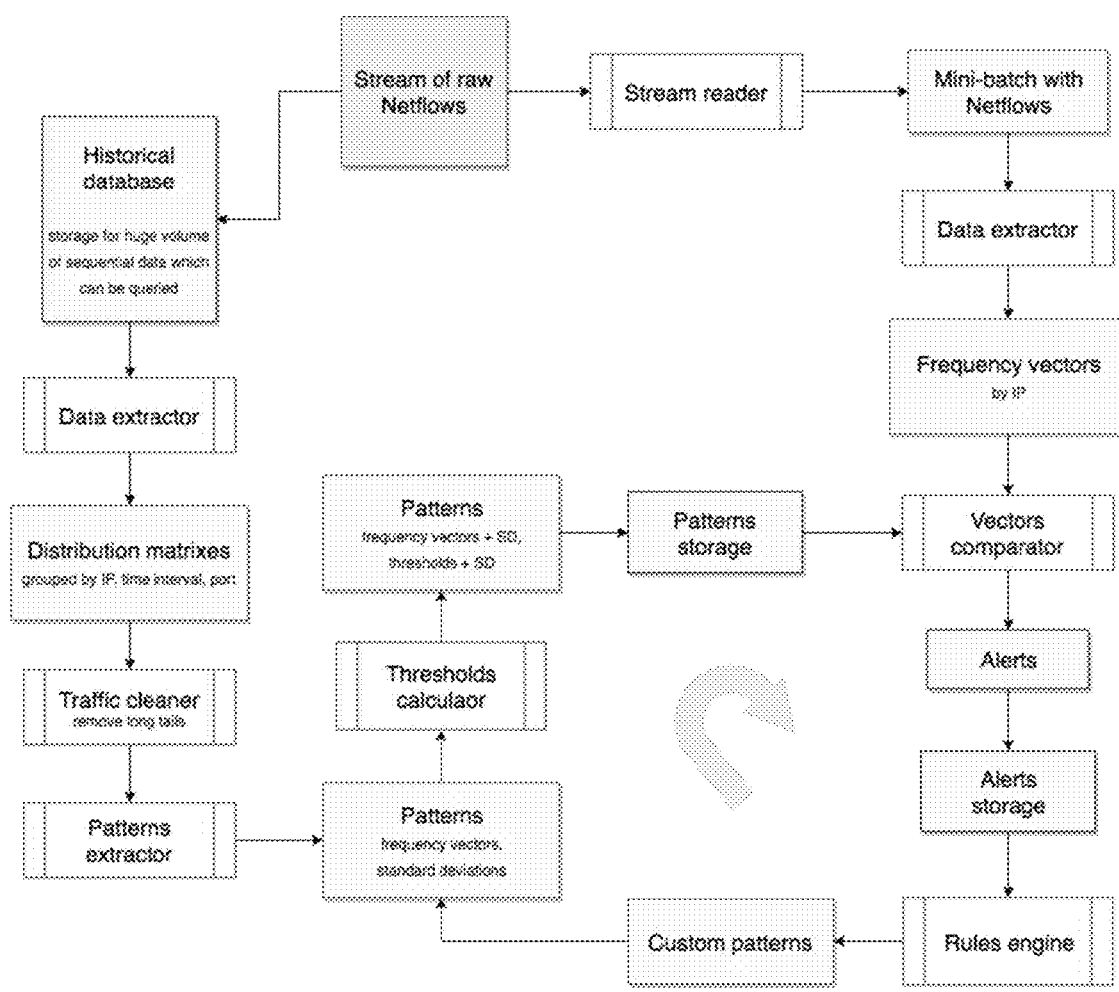
FIG. 6 shows a data flow and data transformations according to one embodiment of the present invention.

FIG. 6 illustrates a data flow and data transformations according to one embodiment of the present invention. The data flow of FIG. 6 begins with a stream of raw NetFlows. From there, the data flow includes two pathways: (1) a historical data analysis pathway and (2) a real time stream processing pathway. In the first pathway, the historical database may be a persistent storage for the entire sequence of NetFlow sessions. This database may be fast-write and able to store a large amount of data, with an example being Apache Cassandra. The data extractor may be an in-memory data processing engine, such as Apache Spark, that is able to read the entire volume of historical data, split the historical data into intervals, and extract distribution matrices for each unique IP address in the dataset. The traffic cleaner may remove long tails, i.e., potential anomalies, and thereby leave only stable traffic for each IP address to be included to the calculated pattern. The patterns extractor may create frequency vectors with their respective standard deviations for each IP address. The thresholds calculator may calculate dynamic thresholds for each IP address during each cycle of calculations. This step may be a repeatable process that can be run continuously. After full pattern creation, these patterns may be stored to any acceptable storage means as binary blobs including meta information.

In the second pathway, a stream reader may be a message broker, such as Apache Kafka or Rabbit MQ, for simple files or sockets that can be read in-stream. NetFlows flowing from a data bus may be read by a stream processing engine, such as Apache Spark and its streaming of Apache Flink, in batches including all NetFlows during a set period of time. The data extractor may be a lighter version of the data extractor described above. This data extractor may receive a data batch and extract vectors of distributions for each IP address specified in the pattern. Once all vectors are extracted, each vector of the second pathway may be compared to the corresponding vector of the first pathway using metrics such as Euclidean distance. Metric values that exceed thresholds may be sent to storage as alerts. The rules engine may read these stored alerts and select the desired response. Moreover, the stored alerts may be converted into custom patterns and added to the repository of calculated patterns.

In an Extract, Transform, Load (ETL) aspect of an algorithm of the present invention, there may be two components in which data is processed: (1) a machine learning model builder, which may process the entire volume of data from the historical database, and (2) a stream processor, which may process the live stream of data divided into mini-batches. Both components may perform the same data pre-processing and distribution matrix extraction for further analysis. Table 1 shows the required network schema.

TABLE 1

| Field | Type | Description |
| --- | --- | --- |
| date_flow_start | Timestamp | Session started |
| date_flow_end | Timestamp | Session finished |
| duration | Float | Session duration |
| protocol | String | IP protocol |
| src_ip | String | Source IP |
| src_port | Integer | Source port |
| dst_ip | String | Destination IP |
| dst_port | Integer | Destination port |

TABLE 1-continued

| Field | Type | Description |
| --- | --- | --- |
| packets | Integer | Number of packets |
| bytes | Integer | Number of bytes |
| URG | byte | URG flag |
| ACK | byte | ACK flag |
| PSH | byte | PSH flag |
| RST | byte | RST flag |
| SYN | byte | SYN flag |
| FIN | byte | FIN flag |

As previously discussed, traffic patterns of the present invention may be based on the entire historical dataset. The historical dataset can be processed based on time intervals of 5 minutes or more. As a first step, traffic is cleaned for pattern extraction. There are several mechanisms for clean traffic pattern extraction which may be utilized in embodiments of the present invention, such as extracting only IP addresses with stable traffic during a determined number of time intervals or identifying the most active subnetworks and only collecting and utilizing these IP addresses. In the stable traffic extraction mechanism, IP addresses with traffic more than a set number of bytes per time interval and with a set activity may be filtered. In the most active subnetworks extraction mechanism, each IP address is separated by components, where the first two numbers are indicative of a specific subnetwork and thus used to calculate frequencies for each subnetwork. The most active subnetworks are identified, and only the relevant IP addresses are utilized. Extraction can also be performed by port, as both incoming and outgoing vectors of traffic distribution per each port for each protocol may be created for each IP address. The incoming traffic data field may be dst_ip-dst_port, while the outgoing traffic data field may be src_ip-dst_port. For vector extraction in this mechanism, all historical data is sliced into certain time intervals, e.g., 1, 5, 10, or more minutes, and for each time interval for each IP address, a quantitative distribution of traffic per each port for each used protocol is calculated.

As a second step, all minor traffic volumes from the total distribution of each IP address per time interval may be removed. The threshold may be configured to depend on the real network traffic. Upon removal of certain values from the matrix, the matrix must be normalized, with a total sum of all values per row equaling 1.

As a third step, all ports with unstable traffic may be removed. By taking the means of each column in the distribution matrix, where each column represents port/protocol, columns with relatively rare and/or small activity may be reset to zero. Upon removal of certain values from the matrix, the matrix must be normalized, with a total sum of all values per row equaling 1.

The result is a distribution matrix for each IP address in the protected network. The pattern for each IP address may include a sparse vector with the means for each column, a sparse vector with the standard deviations for each column, and the Shannon entropy. The pattern may include incoming and outgoing traffic in the same vector. This provides a ratio of incoming and outgoing traffic that may be used as one of the final metrics.

When utilizing only one pattern for the entire matrix, there will be a very high dispersion over each used port, and consequently ports with high dispersion will have high thresholds and low accuracy. Accuracy is improved by clustering. Finding clusters of similar activity in the distribution matrix and subsequently calculating patterns for each cluster using only those rows of the matrix that belong to the particular cluster significantly reduces dispersion and thresholds, thereby increasing accuracy.

A primary metric is a measurement of how similar the traffic is to a particular pattern. This metric may be calculated through the use of three sparse vectors, based on the pattern distribution, the standard deviations, and the real traffic distribution, respectively. One measure of this metric is by calculating the standardized Euclidean distance, which calculates the distance between two sparse vectors in high-dimensional space and accounts for standard deviations of each dimension by drastically increasing the final value of the metric if the difference between two values of the same vector dimension is more than the calculated standard deviation.

To calculate dynamic thresholds for separating normal and abnormal traffic, the following mechanism may be utilized: The entire volume of historical data may be split into time intervals; distributions by port for each IP address per each interval may be calculated; matrices of distributions per each IP address may be constructed; standardized Euclidean distance between each row on the matrix and corresponding pattern may be calculated; and a vector of distances may be produced with the mean and standard deviation being calculated. As a result, the mean may represent the value of the threshold, and the mean plus standard deviation may represent the confidence interval. Because of the heterogeneous environment and typically large number of IP addresses involved, individual thresholds for each metric of each IP address are to be calculated. Additionally, these thresholds should be recalculated during each model construction.

In processing a real time flow of network data, the selected component should be able to process NetFlows as mini-batches with duration dependent on traffic volume and characteristics. The mechanism for processing each mini-batch may be as follows: Distributions by port for each IP address found in the mini-batch are calculated; standardized Euclidean distance between the calculated distribution and corresponding pattern for each IP address are calculated; and alarms are created for each instance where the distance exceeds the related threshold. Alarms may include one or more of the information listed in Table 2.

TABLE 2

| Field | Description |
| --- | --- |
| target IP | IP on which anomaly is occurred |
| warning metric | Name of metric that exceeded threshold |
| warning value | Absolute value of exceeded metric |
| warning threshold | Related threshold |
| warning excess | Threshold excess |
| warning severity | Severity of alert |
| incoming bytes | Total incoming traffic over IP in bytes |
| incoming packets | Total incoming traffic over IP in packets |
| incoming IPs | List of IPs that send packets to target IP |
| outgoing bytes | Total outgoing traffic over IP in bytes |
| outgoing packets | Total outgoing traffic over IP in packets |
| outgoing IPs | List of IPs that receive packets from target IP |
| flows | Information about flows over target IP (protocol, source IP, source port, destination IP, destination port, number of bytes, number of packets) |

A list of potential metrics for utilization in the present invention is provided in Table 3.

TABLE 3

| Metrics | SRC IP | SRC Port | DST IP | DST Port | TCP Flags | Description |
|---|---|---|---|---|---|---|
| incoming_dst_port_dist | many | many | one | many | | Degree of difference from the DST PORTS pattern for incoming to DST IP traffic |
| incoming_dst_port_entropy_dist | many | many | one | many | | Difference of entropy of DST Ports for incoming to DST IP traffic |
| incoming_src_port_dist | many | many | one | many | | Degree of difference from the SRC PORTS pattern for incoming to DST IP traffic |
| incoming_src_port_entropy_dist | many | many | one | many | | Difference of entropy of SRC Ports for incoming to DST IP traffic |
| incoming_tcp_flag_dist | many | many | one | many | 10 flags | Degree of difference from the TCP FLAGS pattern for incoming to DST IP traffic |
| outgoing_dst_port_dist | one | many | many | many | | Degree of difference from the DST PORTS pattern for outgoing from SRC IP traffic |
| outgoing_dst_port_entropy_dist | one | many | many | many | | Difference of entropy of DST Ports for outgoing from SRC IP traffic |
| outgoing_src_port_dist | one | many | many | many | | Degree of difference from the SRC PORTS pattern for outgoing from SRC IP traffic |
| outgoing_src_port_entropy_dist | one | many | many | many | | Difference of entropy of SRC Ports for outgoing from SRC IP traffic |
| outgoing_tcp_flag_dist | one | many | many | many | 10 flags | Degree of difference from the TCP FLAGS pattern for outgoing from SRC IP traffic |

The created alarms may indicate one or more types of attack, based on the metrics of Table 3, including attacks relating to, e.g., abnormal server activity, a port scan from one IP address, a port scan from several IP addresses, a syn-flood from several IP addresses to one port, and a distributed denial of service (DDOS) from several IP addresses to one port. Examples are provided in Table 4.

TABLE 4

| Attack Type | Description |
|---|---|
| Abnormal server activity | Metrics incoming_dst_port_dist and outgoing_src_port_dist illustrate use of non-standard ports for particular server; metrics incoming_src_port_dist and outgoing_src_port_dist can illustrate requests from non-standard ports |
| Port scan from one IP | Significant outliers of metrics *_dst_port_entropy_dist, *_dst_port_dist, and potentially *_tcp_flag_dist |
| Port scan from many IP | Significant outliers of metrics incoming_dst_port_entropy_dist, incoming_dst_port_dist, and potentially incoming_tcp_flag_dist |
| Syn-flood from many IP to one port | Significant outliers of metrics incoming_tcp_flag_dist and outgoing_tcp_flag_dist due to the mass of similar requests with TCP SYN flag |
| DDOS from many IP to one port | 1. Closed connect right after request: incoming_tcp_flag_dist and outgoing_tcp_flag_dist; 2. Receive response: created pattern with number of requests per time interval from one IP address, distribution of TCP flags and traffic volumes |

The embodiments and examples above are illustrative, and many variations can be introduced to them without departing from the spirit of the disclosure or from the scope of the appended claim. For example, elements and/or features of different illustrative and exemplary embodiments herein may be combined with each other and/or substituted with each other within the scope of this disclosure. For a better understanding of the invention, its operating advantages and the specific objects attained by its uses, reference should be had to the accompanying drawings and descriptive matter in which there are illustrated exemplary embodiments of the invention.

What is claimed is:

1. A system for unsupervised detection of system anomalies in a network, comprising:
   one or more network elements;
   a flow collector configured to collect instances of network data from the one or more network elements;
   wherein the network data comprises a timestamp, a session duration, a protocol, a source IP address, a source port, a destination IP address, a destination port, a number of bytes, a number of packets, and a number of transmission control protocol (TCP) flags;
   a historical dataset database configured to store the instances of network data;
   a historical dataset pattern extractor configured to analyze the instances of network data and produce a historical behavioral pattern for each of the instances of network data; and
   a flow stream processor configured to analyze instances of network data in real time, produce a current behavioral pattern for each of the instances of network data, compare the current behavioral pattern to a corresponding historical behavioral pattern, and detect an anomaly based on the comparison between the 20 current behavioral pattern and the corresponding historical behavioral pattern.

2. The system of claim 1, wherein the historical dataset pattern extractor is configured to process the instances of network data by an unsupervised clustering algorithm.

3. The system of claim 2, wherein the historical dataset pattern extractor is configured to produce a metric threshold value for each of the instances of network data, wherein a value based on the current behavioral pattern in excess of the metric threshold value is indicative of a potential system anomaly.

4. The system of claim 3, further comprising a historical model storage database for storing historical models based on the historical behavioral pattern and the metric threshold value.

5. The system of claim 2, wherein the historical behavioral pattern and the current behavioral pattern are represented as respective vectors, wherein the comparison between the current behavioral pattern and the corresponding historical behavioral pattern is a calculation of standardized Euclidean distance between the respective vectors.

6. The system of claim 2, wherein the flow stream processor is configured to produce a notification upon detection of an anomaly.

7. The system of claim 6, wherein the notification is stored in an anomalies storage database and sent to a system administrator.

8. The system of claim 6, wherein the notification is sent to a rules engine, wherein the rules engine is configured to select a response to the notification.

9. The system of claim 8, wherein the rules engine is configured to convert the notification into a custom behavioral pattern and store the custom behavioral pattern in a historical dataset pattern storage database.

10. A method for unsupervised detection of system anomalies in a network, comprising:
    collecting instances of network data from one or more network elements in the network in a flow collector;
    wherein the network data comprises a timestamp, a session duration, a protocol, a source IP address, a source port, a destination IP address, a destination port, a number of bytes, a number of packets, and a number of transmission control protocol (TCP) flags;
    storing the instances of network data in a historical dataset database;
    analyzing the instances of network data and producing a historical behavioral pattern for each of the instances of network data by a historical dataset pattern extractor;
    analyzing the instances of network data in real time and producing a current behavioral pattern for each of the instances of the network data by a flow stream processor;
    comparing the current behavioral pattern to a corresponding historical behavioral pattern; and
    detecting an anomaly based on the comparison between the current behavioral pattern and the corresponding historical behavioral pattern.

11. The method of claim 10, wherein the historical dataset pattern extractor is configured to process the instances of network data by an unsupervised clustering algorithm.

12. The method of claim 10, wherein the historical dataset pattern extractor is configured to produce a metric threshold value for each of the instances of network data, wherein a value based on the current behavioral pattern in excess of the metric threshold value is indicative of a potential system anomaly.

13. The method of claim 12, further comprising storing historical models based on the historical behavioral pattern and the metric threshold values by a historical model storage database.

14. The method of claim 10, wherein the historical behavioral pattern and the current behavioral pattern are represented as respective vectors, wherein the comparison between the current behavioral pattern and the corresponding historical behavioral pattern is a calculation of standardized Euclidean distance between the respective vectors.

15. The method of claim 10, wherein the flow stream processor is configured to produce a notification upon detection of an anomaly.

16. The method of claim 15, wherein the notification is stored in an anomalies storage database and sent to a system administrator.

17. The method of claim 15, wherein the notification is sent to a rules engine, wherein the rules engine is configured to select a response to the notification.

18. The method of claim 17, wherein the rules engine is configured to convert the notification into a custom behavioral pattern and store the custom behavioral pattern in a historical dataset pattern storage database.

* * * * *